R. GEOFFROY.
PIPE CUTTER.
APPLICATION FILED FEB. 7, 1911.
1,006,080.
Patented Oct. 17, 1911.
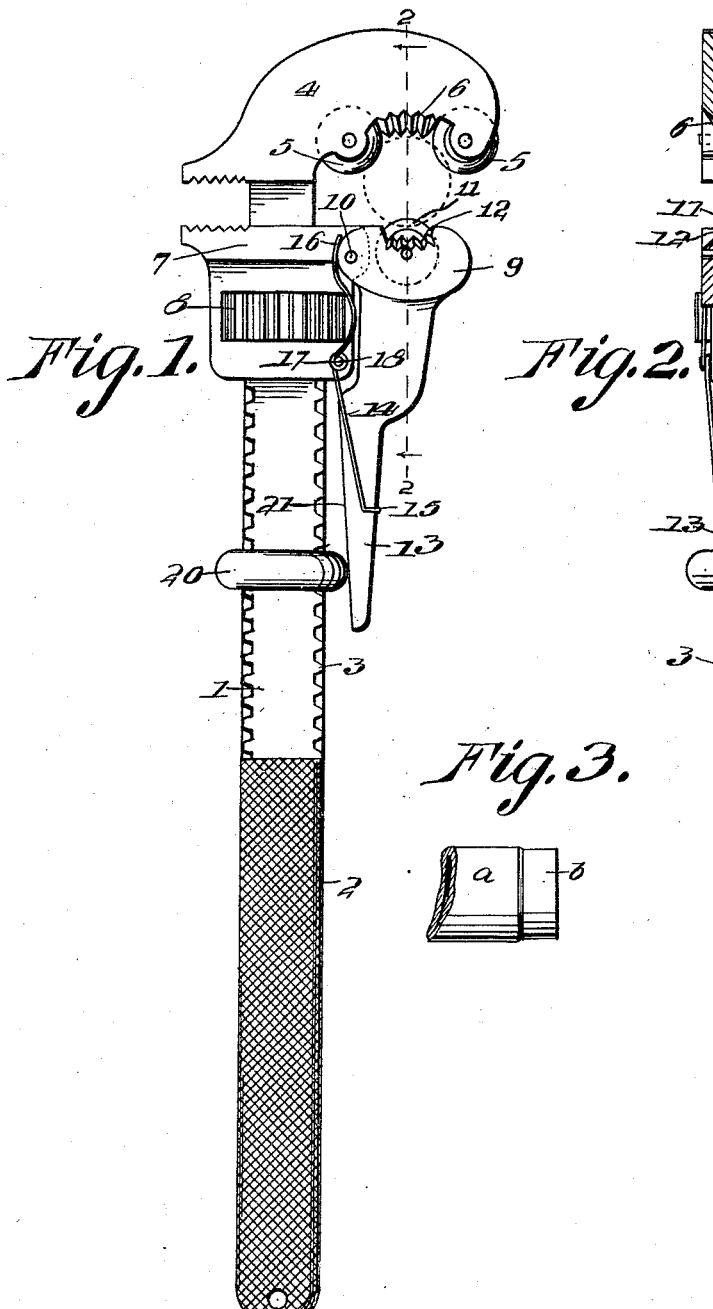
Fig. 1.
Fig. 3.
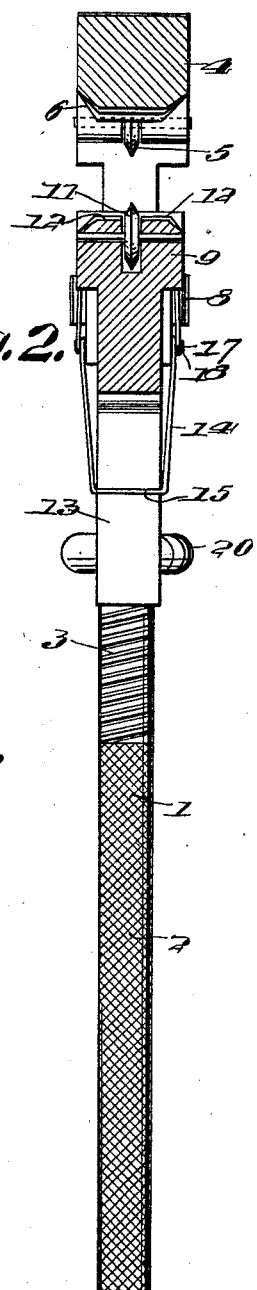
Fig. 2.
WITNESSES
Ernest C. Barth
Ada E. Hagerty
INVENTOR
Raymond Geoffroy
by Joseph H. Miller
Attorney

UNITED STATES PATENT OFFICE.

RAYMOND GEOFFROY, OF ARCTIC, RHODE ISLAND.

PIPE-CUTTER.

1,006,080.      Specification of Letters Patent.      Patented Oct. 17, 1911.

Application filed February 7, 1911. Serial No. 607,122.

*To all whom it may concern:*

Be it known that I, RAYMOND GEOFFROY, a citizen of the United States, residing at Arctic, in the county of Kent and State of Rhode Island, have invented a new and useful Improvement in Pipe-Cutters, of which the following is a specification.

This invention relates to certain new and useful improvements in a pipe cutter and the object of the invention is to provide a tool of the type set forth which will, after the pipe is cut, act to smooth or slightly reduce the ends of the pipe, so that when the threading tool is placed on the pipe to cut the threads thereon, no obstruction or other resistance to the proper disposition of the threading tool will be offered.

A further object of the invention is to provide a tool of this character which is of simple and economical construction, and of high efficiency and practicability in use.

Further and other objects will be later set forth and of themselves evidenced.

In the drawings: Figure 1 is a side elevation of the invention, Fig. 2 is a section on the line 2—2 of Fig. 1, and Fig. 3 is a fragmentary side elevation of a pipe showing the manner in which the ends of the same may be reduced by the smoothing teeth.

The shank of the tool is designated 1 in the drawings and is formed beyond its handle portion 2 with a rack 3. A rigid jaw 4 is secured to one end of the shank 1 and carries two spaced cutter wheels 5. The portion of the jaw 4 in the space between the cutter wheels 5 is formed with a series of transverse cutting teeth 6, the object and function of which is to smooth the pipe or slightly reduce the ends thereof at the completion of the cutting operation.

7 designates a sliding jaw provided with the usual rotating nut 8 which engages the rack 3 in order to move the jaw 7 along the length of the shank 1. A supplemental jaw 9 is pivoted as at 10 to sliding jaw 7 and carries a cutter wheel 11. As clearly shown in Fig. 2 of the drawing the jaw 9 is provided with two series of cutting teeth 12, one series being located on one side of the cutter wheel 11 and the other series being located on the opposite side thereof. It will be observed that the cutter wheel 11 projects beyond the two series of teeth 12 so that on the completion of the cutting operation the teeth 12 may enter into action to smooth off the fins usually raised or formed at the cutting point after the pipe has been cut.

The supplemental jaw 9 is formed with a depending tail 13, which has a beveled or inclined face 21, forming a wedge-space in conjunction with the shank 1, as depicted in Fig. 1, of the drawings. A U-shaped spring 14, has its sides extending on opposite side faces of the tail 13 and has its cross piece 15 engaging the outer face of the tail, the spring being formed on its sides with coils 17, engaged over pins 18, carried by the lower side of the sliding jaw 7. The upper free ends of the spring sides engage the supplemental jaw 9, whereby the tendency of the spring is to obviously force the tail 13 of the supplemental jaw toward shank 1. A rotating nut 20 engages over rack 3 of shank 1 and has its peripheral edge engaged with the beveled face 21, of tail 13, whereby it will be evident that upon rotation of the nut the tail will be moved inwardly or outwardly with respect to the shank, causing a corresponding movement of the pivoted jaw 9, with the obvious effect of moving the cutter wheel 11 toward the pipe being cut. After the cutting wheels having completed their cutting movement, it will be seen that the teeth 6 and 12 will enter into action removing the fin usually resulting from the cutting action and thereby smoothing the pipe ends, or the teeth may be caused to form the reduced portion *b* of the pipe *a*, as depicted in Fig. 3 of the drawings.

It is evident that the handle portion 2 may be a separate piece attached to the rack portion or the entire shank 1 may be formed of one piece of metal with the jaw 4 when the portion 2 will be slightly reduced to permit the passing of the jaw 7, nut 8 and nut 20 to engage with the rack 3.

The rear ends of the rigid jaw 4 and the sliding jaw 7, are formed with parallel jaw faces, in order that same may be utilized for purpose of turning nuts, or other square or hexagonal work.

Having thus described my invention, I claim as new and desire to secure by Letters Patent;—

1. In a pipe cutter, in combination with a shank formed with a rack, a nut engaging the rack, a sliding jaw on the shank having a nut engaging the rack, a supplemental jaw pivoted to the sliding jaw and formed with a beveled face to engage with said first named nut, a spring carried by the sliding jaw for engagement with the pivoted jaw to hold the latter in contact with the first named nut, and a rigid jaw on the shank.

2. In a pipe cutter, a shank, a rigid jaw on the shank, a sliding jaw on the shank, a supplemental jaw pivoted to the sliding jaw, said supplemental jaw having a tail extending outwardly therefrom, said tail having a beveled face, means on the shank to engage the beveled face and move the tail outwardly, and a spring carried by the sliding jaw and having a portion thereof engaging said tail to hold the same in contact with the actuating means thereof.

3. In a pipe cutter, a shank formed with a rack, a rigid jaw on the shank, a sliding jaw on the shank having a nut engaging the rack, a supplemental jaw pivoted to the sliding jaw and having a tail depending therefrom, and formed with a beveled face, a second nut on the shank engaging said beveled face of the tail, pins on opposite sides of the sliding jaw, and a spring of U-shape having its sides extending on opposite sides of the tail and having its cross piece engaging the outer face of the tail, the sides of the said spring being formed with coils which receive said pins, the outer free ends of the spring sides bearing against the supplemental jaw adjacent the outer end thereof.

In testimony whereof I have signed my name to this specification in the presence of two subscribing witnesses.

RAYMOND GEOFFROY.

Witnesses:
ADA E. HAGERTY,
J. A. MILLER.

---

Copies of this patent may be obtained for five cents each, by addressing the "Commissioner of Patents, Washington, D. C."